United States Patent [19]

Rüthlein et al.

[11] Patent Number: 5,698,905
[45] Date of Patent: Dec. 16, 1997

[54] HYBRID PROPULSION SYSTEM FOR A MOTOR VEHICLE AND A METHOD OF OPERATING THE HYBRID PROPULSION SYSTEM

[75] Inventors: Alfred Rüthlein, Sennfeld; Erich Karg, Detter, both of Germany

[73] Assignee: Fichtel & Sachs AG, Schweinfurt, Germany

[21] Appl. No.: 539,223

[22] Filed: Oct. 4, 1995

[30] Foreign Application Priority Data

Oct. 5, 1994 [DE] Germany ............ 44 35 613.7

[51] Int. Cl.$^6$ ............ B60L 11/02; F02N 11/00
[52] U.S. Cl. ............ 290/32; 290/45; 180/65.4
[58] Field of Search ............ 180/65.4, 65.3, 180/65.2; 290/45, 17, 14, 16, 50, 30 R, 30 A, 30 B, 31, 32, 33, 35

[56] References Cited

U.S. PATENT DOCUMENTS

| | | | |
|---|---|---|---|
| 4,335,429 | 6/1982 | Kawakatsu | 364/431.04 |
| 4,923,025 | 5/1990 | Ellers | 180/65.2 |
| 5,558,175 | 9/1996 | Sherman | 180/65.2 |

FOREIGN PATENT DOCUMENTS

| | | |
|---|---|---|
| 0559147 | 9/1932 | Germany . |
| 4133059 | 4/1993 | Germany . |
| 2005205 | 4/1979 | United Kingdom . |

OTHER PUBLICATIONS

VDI–Berichte Nr. 878, "Das elektrische Getriebe von Magnet–Motor für PKW und Omnibusse", 1991, pp. 611–622.

*Primary Examiner*—Thomas M. Dougherty
*Assistant Examiner*—Christopher Cuneo
*Attorney, Agent, or Firm*—Nils H. Ljungman and Associates

[57] ABSTRACT

A hybrid propulsion system for a motor vehicle, in which electric motors corresponding to the wheels of the motor vehicle are supplied by a generator, which generator is driven by an internal combustion engine, in particular via a direct current intermediate circuit. To be able to start the internal combustion engine, in the event of the failure of the battery provided for starting the internal combustion engine, by pushing or towing the vehicle or rolling it downhill, the electric motors can be switched over to operate as generators, and the generator can be switched over to operate as a motor, during an emergency starting phase, once the speed of travel of the vehicle exceeds a specified speed threshold. The emergency starting attempt can be initiated by the driver by means of a control mechanism, e.g. a manually actuated control switch or the accelerator pedal. If necessary, the speed threshold can be measured by means of a speed sensor. A voltage monitoring device can essentially guarantee that before the emergency starting attempt takes place, there is sufficient operating voltage available for the control systems which correspond to the electric motors and the generator.

21 Claims, 3 Drawing Sheets

HYBRID PROPULSION SYSTEM FOR A MOTOR VEHICLE AND A METHOD OF OPERATING THE HYBRID PROPULSION SYSTEM

BACKGROUND OF THE INVENTION

1. Field of the Invention

The present invention generally relates to a hybrid propulsion system for a motor vehicle and a method of operating same, the hybrid propulsion system generally including an internal combustion engine, an electrical generator in driving connection with the internal combustion engine, and at least one electric motor connected to the generator. In addition, the hybrid propulsion system can also have an electronic control system which controls the generator and at least the electric motor, and possibly also the internal combustion engine, during traction operation.

2. Background Information

DE-A-41 33 059 discloses a hybrid propulsion system for a motor vehicle, in which system the drive wheels of the vehicle have individual electric motors which, for their part, are supplied by a generator. The generator is, in turn, driven by an internal combustion engine. The electric motors and the generator are polyphase machines which are connected to one another by means of a direct current intermediate circuit operating on a medium-voltage level of 500 to 1000 V, for example. The generator and electric motors have controllable rectifiers or inverters which are controlled by an electronic control system as a function of the operation of the vehicle.

Independently of the direct current intermediate circuit, motor vehicles of the type described above typically have a vehicle low-voltage electrical system which operates at 12 or 24 V, for example, and which supplies an operating voltage to numerous consumers, generally also including the electronic components of the control system. The internal combustion engine can generally be started by en electric starter motor which is supplied with electrical energy by the vehicle low-voltage electrical distribution system. But it is also known (VDI-Berichte No. 878, 1991, pages 611-622) that the generator which is non-rotationally coupled to the internal combustion engine can also be operated as a motor, and can be used, in particular, as a starter motor. However, both the separate starter motor and the generator being operated as a motor can require a sufficiently powerful power source to accelerate the internal combustion engine to the conventional starting speed of 100 to 300 rpm, as part of which procedure they must overcome the comparatively high moment of resistance of the internal combustion engine. In both variants, moreover, it must essentially be guaranteed that the low voltage of the vehicle electrical energy distribution system is high enough for the operation of the electronic components of the control system. This situation can be problematic if the capacity of the battery of the vehicle electrical energy distribution system is too low, in particular if the battery is charged by the generator from the direct current intermediate circuit, and the commutation of the generator is not guaranteed, because of the insufficient operating voltage of the control system.

OBJECT OF THE INVENTION

The object of the present invention is to create a method whereby, in a hybrid propulsion system of the type described above, the internal combustion engine can be started, even if there is not a sufficient voltage source available for the starting process.

SUMMARY OF THE INVENTION

The present invention is based, in accordance with at least one preferred embodiment, on a hybrid propulsion system for a motor vehicle including an internal combustion engine, an electrical generator in a driving connection with the internal combustion engine, at least one electric motor, in particular connected to the generator by means of a direct current intermediate circuit, for the propulsion of at least one of the wheels of the motor vehicle, and an electronic control system which controls the generator and at least the one electric motor, and possibly also the internal combustion engine in traction operation.

By means of the control system for the emergency starting of the internal combustion engine, the generator can be switched over to operate as a motor, in which mode the generator drives the internal combustion engine. In addition, the at least one electric motor can be switched over to operate as a generator which is driven by the wheel, such that when the vehicle is moved by external forces, the electric motor operating as a generator can supply power to the generator operating as a motor.

A motor vehicle with a hybrid propulsion system of the type described above can preferably be accelerated by pushing or towing the vehicle, or by rolling it downhill, until the electric power generated by the electric motor is sufficient to start the internal combustion engine, by means of the generator operating as a motor (i.e. a starter motor). In this case, the electric motor is most appropriately operated as a passive, uncontrolled generator, which accumulates sufficient voltage in the direct current intermediate circuit to preferably allow the generator to operate as a motor.

The motor vehicle should preferably be accelerated to a certain minimum speed to guarantee that its kinetic energy is sufficient to generate the electrical energy necessary for the starting procedure. To automate such an emergency starting procedure, the present invention teaches that the control system responds to means which measure the speed of travel of the vehicle, and permit the beginning of an emergency starting operation, essentially only when the vehicle speed measurement means have indicated that the vehicle has reached a speed of travel which is greater than a specified speed threshold. In this manner, the starting of the motor vehicle can be automatically prevented if the motor vehicle does not have sufficient kinetic energy, and thus the vehicle is decelerated or braked before the desired starting operation occurs.

However, the control system can also be designed so that it reacts to a control mechanism which is actuated by the driver of the motor vehicle, and permits the emergency starting operation essentially only when the control mechanism has been actuated. By means of the control mechanism, which can be designed, for example, in the form of a manually actuated control switch or as a sensor which measures the displacement of an accelerator pedal of the motor vehicle, the time of the attempted start can be determined by the driver. Instead of an automatic monitoring of the speed of the vehicle to determine whether the vehicle has exceeded the speed threshold, the driver can therefore decide, on the basis of his own experience, whether the vehicle has reached a sufficient speed. However, it can also be advantageous to initiate the emergency starting procedure manually, even when the speed of the vehicle is monitored automatically by the control system, since this procedure can prevent the driver from being surprised by the starting of the internal combustion engine when, for example, the vehicle is being towed.

Appropriately, the control system can monitor the starting of the internal combustion engine with the assistance of means which measure the operating status of the engine, which means, for example, directly or indirectly respond to:

the increase in rotational speed that occurs during the starting of the internal combustion engine (due to the disconnection of the generator); or to the disconnection of the generator.

The control system can essentially guarantee that, immediately after the starting of the internal combustion engine, the generator ceases to operate as a motor, and the electric motor ceases to operate as a generator, so that a switchover to the normal operating conditions for traction operation can then take place. i.e. the flow of electric power then runs from the generator to the electric motors.

In particular, in embodiments in which the control system automatically controls the emergency starting procedure, it can also be advantageous if the control system includes timers, which timers define a maximum duration of an emergency starting phase of operation and/or a minimum interval of time between successive emergency starting phase of operation. In this manner, uncontrollable operating conditions, e.g. like those which might occur if the internal combustion engine starts for only a few revolutions of the crankshaft and then dies, can essentially be prevented.

To be able to supply the electronic components with operating voltage, even in the event of insufficient voltage from the vehicle electrical energy distribution system, the control system is appropriately connected to an operating voltage power supply circuit, which circuit can be supplied by the electric motor.

The operating voltage power supply circuit can comprise means to monitor the voltage, so that the operating voltage power supply circuit essentially only releases the operating voltage for the control system when the operating voltage exceeds a specified voltage threshold. In this manner, it can essentially be guaranteed that the control system will be able to properly perform the tasks assigned to it for the emergency starting operation. The operating voltage power supply circuit can be appropriately connected to the direct current intermediate circuit by means of a direct current converter, and can simultaneously act as a charging circuit for the low-voltage battery of the vehicle during normal operation.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

One aspect of the invention resides broadly in a method of operating and starting a hybrid road vehicle under emergency conditions, the method comprising the steps of: moving the hybrid road vehicle and moving at least one wheel of the hybrid road vehicle; switching an electrical generator from operation as a generator to operation as a motor, the electrical generator being in driving connection with an internal combustion engine; switching at least one electric motor disposed at the at least one wheel from operation as a motor to operation as a generator; connecting the at least one motor to the electrical generator with connecting circuitry; driving the at least one electric motor as a generator during movement of the at least one wheel of the hybrid road vehicle; accumulating electric energy from the at least one electric motor; supplying electric energy, generated by the at least one electric motor, to the electrical generator; and starting the internal combustion engine with the electrical generator.

Another aspect of the invention resides broadly in a hybrid road vehicle comprising: a chassis; a plurality of wheels being rotationally mounted on the chassis; a plurality of road vehicle tires being disposed on corresponding ones of the plurality of wheels; a hybrid propulsion system, the hybrid propulsion system comprising: an internal combustion engine; an electrical generator in driving connection with the internal combustion engine; at least one electric motor for propelling at least one of the plurality of wheels; connecting circuitry connecting the at least one electric motor to the electrical generator; apparatus for electronically controlling at least the generator and the at least one electric motor during operation of the hybrid road vehicle; the apparatus for electronically controlling comprising apparatus for starting the hybrid road vehicle under emergency conditions; the apparatus for starting the hybrid road vehicle under emergency conditions comprising: first apparatus for switching the electrical generator from operation as a generator to operation as a motor; second apparatus for switching the at least one electric motor from operation as a motor to operation as a generator; circuit apparatus for supplying electric energy generated by the at least one electric motor to the electrical generator to start the internal combustion engine; the at least one electric motor being disposed to be driven by movement of the at least one of the plurality of wheels during movement of the hybrid road vehicle, thus driving the at least one electric motor as a generator, and being connected to the circuit apparatus to supply electrical energy to the electrical generator when the electrical generator is being operated as a motor.

Yet another aspect of the invention resides broadly in a method of operating and starting a hybrid road vehicle under emergency conditions, the hybrid road vehicle comprising: a chassis; a plurality of wheels being rotationally mounted on the chassis; a plurality of road vehicle tires being disposed on corresponding ones of the plurality of wheels; a hybrid propulsion system, the hybrid propulsion system comprising: an internal combustion engine; an electrical generator in driving connection with the internal combustion engine; at least one electric motor for propelling at least one of the plurality of wheels; connecting circuitry connecting the at least one electric motor to the electrical generator; apparatus for electronically controlling at least the generator and the at least one electric motor during operation of the hybrid road vehicle; the apparatus for electronically controlling comprising apparatus for starting the hybrid road vehicle under emergency conditions; the apparatus for starting the hybrid road vehicle under emergency conditions comprising: first apparatus for switching the electrical generator from operation as a generator to operation as a motor; second apparatus for switching the at least one electric motor from operation as a motor to operation as a generator; circuit apparatus for supplying electric energy generated by the at least one electric motor to the electrical generator to start the internal combustion engine; the at least one electric motor being disposed to be driven by movement of the at least one of the plurality of wheels during movement of the hybrid road vehicle, thus driving the at least one electric motor as a generator, and being connected to the circuit apparatus to supply electrical energy to the electrical generator when the electrical generator is being operated as a motor, the method comprising the steps of: providing a chassis; providing a plurality of wheels being rotationally mounted on the chassis; providing a plurality of road vehicle tires being disposed on corresponding ones of the plurality of wheels; providing a hybrid propulsion system, the step of providing the hybrid propulsion system comprising: providing an internal combustion engine; providing an electrical generator in driving connection with the internal combustion engine; providing at least one electric motor for propelling at least one of the plurality of wheels; providing connecting circuitry connecting the at least one electric motor to the electrical generator; providing apparatus for electronically controlling at least the generator and the at least one electric motor during operation of the hybrid road vehicle; the step of providing the apparatus for electronically controlling further comprising providing apparatus for starting the hybrid road vehicle under emergency conditions; the step of providing apparatus for starting the hybrid road vehicle under emergency conditions comprising: providing first apparatus for switching the electrical generator from operation as a generator to operation as a motor; providing second apparatus for switching the at least one electric motor from operation as a motor to operation as a generator; providing circuit apparatus for supplying electric energy generated by the at least one electric motor to the electrical generator to start the internal combustion engine; the method further comprising the steps of: switching the electrical generator from operation as a generator to operation as a motor, with the first apparatus for switching; switching the at least one motor from operation as a motor to operation as a generator, with the second apparatus for switching; moving the hybrid road vehicle to move the at least one of the plurality of wheels to drive the at least one electric motor as a generator; generating electric energy with the at least one electric motor; supplying electric energy generated by the at least one electric motor to the electrical generator with the circuit apparatus; and starting the internal combustion engine with the electrical generator.

BRIEF DESCRIPTION OF THE DRAWINGS

The present invention is explained in greater detail below with reference to the accompanying drawings, in which.

DESCRIPTION OF THE PREFERRED EMBODIMENT

Figure 1:
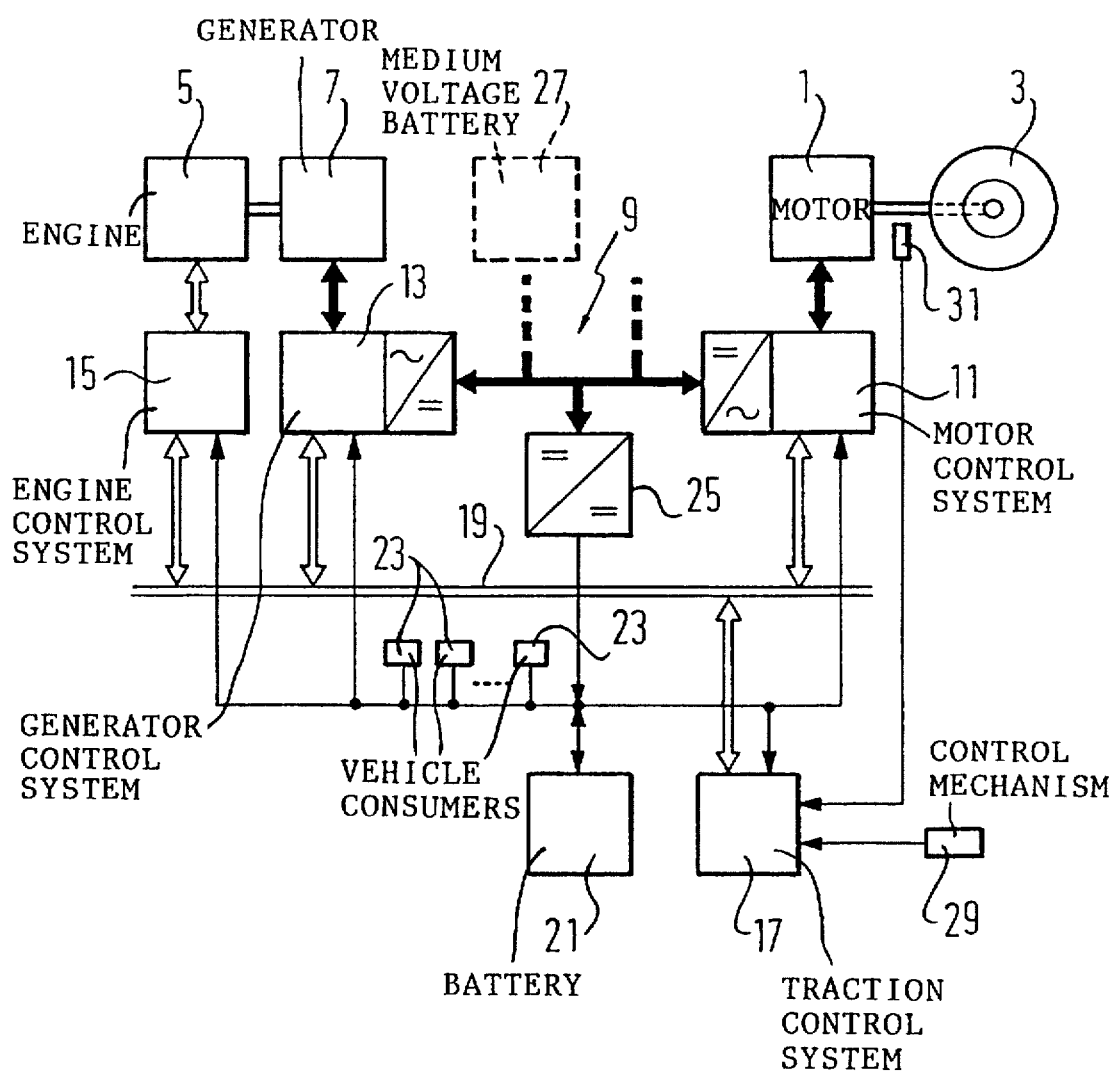
FIG. 1 shows a schematic block diagram of a motor vehicle which has a hybrid propulsion system, the internal combustion engine of which can also be started by an emergency starting procedure by pushing or towing the vehicle or rolling it downhill.

The hybrid propulsion system of a motor vehicle, as schematically illustrated in FIG. 1, can preferably include at least one electric motor for the propulsion of at least one wheel 3 of the vehicle. Individual wheels 3 of the vehicle can also have corresponding electric motors 1, however, individual electric motors 1 can also be connected by means of differential transmissions or similar devices so that they drive more than one wheel 3. During normal operation of the vehicle, the electric motors 1 can be supplied by a direct current intermediate circuit indicated by 9, which direct current intermediate circuit 9 can be fed by an electrical generator 7 which generator 7, for its part, can be driven by an internal combustion engine 5. The electric motor or motors 1 and the generator 7 can be designed as multi-pole or polyphase electrical machines which can be operated both as generators and as motors. Examples of these types of machines are listed at the close of the instant specification.

Corresponding to each electric motor 1 there can be an electronic motor control system 11, which control system 11, by means of semiconductor circuits or similar mechanisms (not shown here) can control the commutation of the corresponding electric motor i. The electronic commutation can be performed so that phase-shifted, pulsating direct currents, or even phase-shifted alternating currents, can preferably be generated from the direct current voltage of the direct current intermediate circuit 9.

Figure 1A:
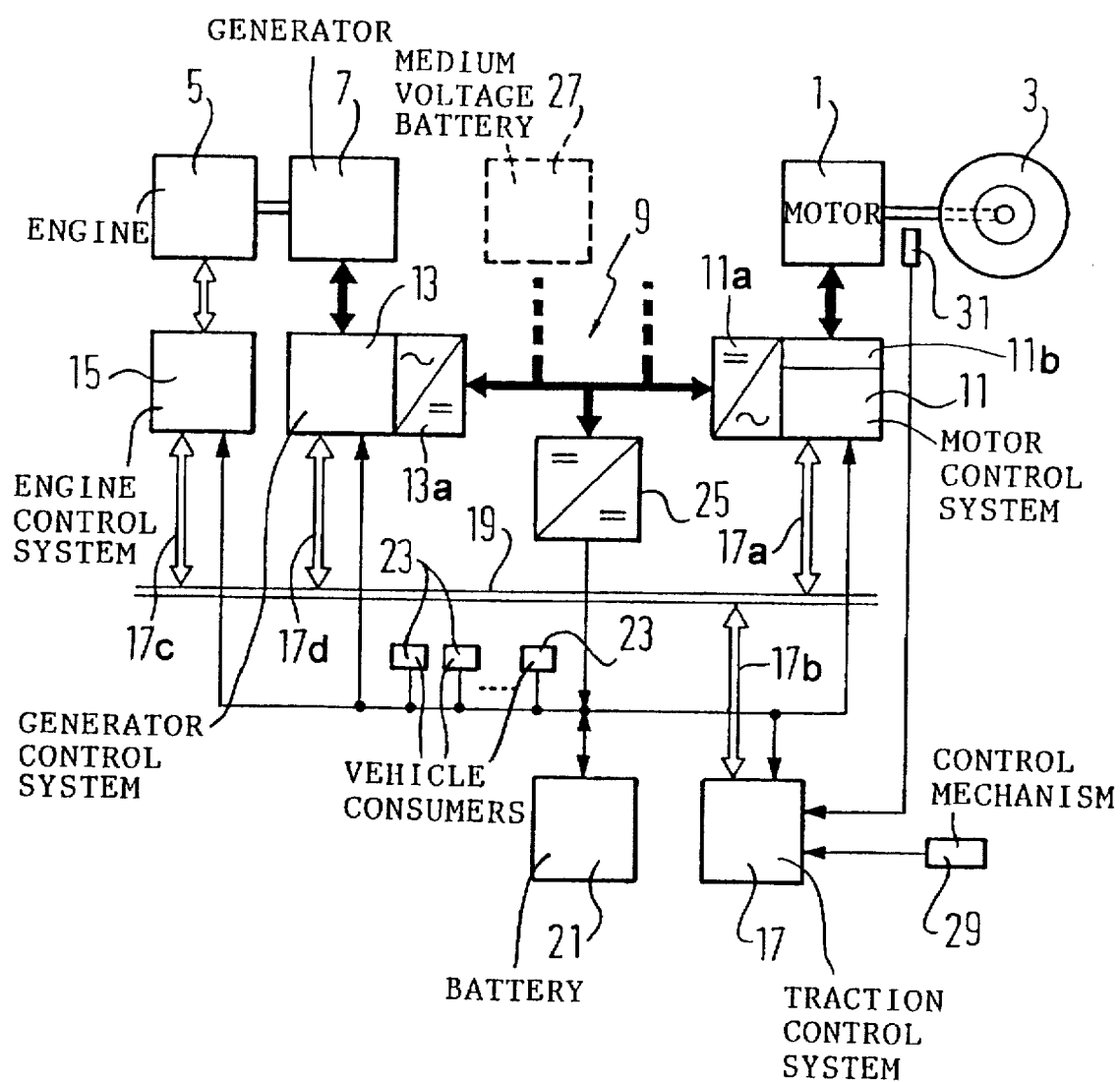
FIG. 1a shows substantially the same view as FIG. 1, but is more detailed.

In accordance with one embodiment of the present invention as shown in FIG. 1a, the control system 11 can preferably have a converter 11a, which converter 11a can convert direct current from the direct current intermediate circuit 9 into alternating current for the electric motor 1, during normal operation. Further, the converter 11a, in accordance with one possible embodiment, can be reversible, i.e., the converter 11a can also convert alternating current generated by the electric motor 1 (which electric motor 1 is being operated as a generator) during an emergency start-up procedure to direct current for the direct current intermediate circuit 9.

Alternatively, in accordance with an additional embodiment, the converter 11a can preferably convert direct current to alternating current during normal operation, and there can be an auxiliary converter associated with the converter 11a, which auxiliary converter converts alternating current generated by the electric motor 1 (which electric motor 1 is being operated as a generator) to direct current for the direct current intermediate circuit 9 during an emergency start-up procedure. In addition, there can preferably be a switching system which can be controlled by the control system 17 discussed further below, which switching system can switch from the converter 11a to the auxiliary converter during an emergency start-up, in order to allow current to run from the electric motor 1 to the generator 7. The switching system can also preferably switch from the auxiliary converter to the converter 11a once the internal combustion engine 5 has started, to allow current to run from the generator 7 to the electric motor 1 under normal operating conditions. Such a switching system is well known to one of ordinary skill in the art, and will therefore not be discussed further here.

Corresponding to the generator 7 there can be an electronic generator control system 13, which control system 13 can simultaneously control the electronic commutation and conversion of the currents generated by the generator 7 into direct current for the direct current intermediate circuit 9. The direct current voltage intermediate circuit 9 can operate on a medium voltage level, e.g. between about 500 V and about 1000 V.

In accordance with one embodiment of the present invention as shown in FIG. 1a, the control system 13 can preferably have a converter 13a, which converter 13a can convert the alternating current from the generator 7 into direct current for the direct current intermediate circuit 9 during normal operation. Further, the converter 13a, in accordance with one embodiment, can be reversible, i.e., the converter 13a can convert direct current from the direct current intermediate circuit 9 into alternating current for the generator 7 (which generator 7 is being operated as a motor) during an emergency start-up procedure.

Alternatively, the converter 13a can preferably convert alternating current to direct current during normal operation, and there can be an auxiliary converter associated with converter 13a, which auxiliary converter converts direct current from the direct current intermediate circuit 9 into alternating current for the generator 7 being operated as a motor during an emergency start-up. In addition, there can preferably be a switching system which can be controlled by the control system 17 discussed further below, which switching system can switch from the converter 13a to the auxiliary converter during an emergency start-up, in order to allow current to run from the electric motor 1 to the generator 7. The switching system can also preferably switch from the auxiliary converter to the converter 13a once the internal combustion engine 5 has started, to allow current to run from the generator 7 to the electric motor 1 under normal operating conditions. Such a switching system is well known to one of ordinary skill in the art, and will therefore not be discussed further here.

Corresponding to the internal combustion engine 5, there can be an engine control system 15 in the conventional manner, which control system 15 can control the engine power and the engine speed, in particular. The motor control system 11, the generator control system 13 and the engine control system 15 can preferably be controlled as a function of the vehicle situation by a traction control system 17, to which traction control system 17 they can be connected by means of a data bus 19, for example. The control systems 11, 13, 15 and 17 can respond, by means of sensors which are not illustrated in detail here, to operating parameters of the electric motors 1, of the internal combustion engine 5 and of the generator 7, as well as to control mechanisms which can be operated by the driver of the vehicle, such as a selector switch or an accelerator pedal. Details of such a control system are discussed further in the above-referenced DE-A-41 33 059, which is hereby incorporated by reference herein.

In accordance with one embodiment of the present invention, the control system 17 can control, as indicated by arrows 17a and 17b in FIG. 1a, the control system 11, including the converter 11a and any auxiliary converter, as discussed above. In addition, the control system 17 can also control, as indicated by arrows 17c and 17d in FIG. 1a, the control system 15 and the control system 13, respectively. Of course, the control system 17, in controlling the control system 13, can also control the converter 13a and any auxiliary converter, as discussed above.

In addition to the direct current voltage intermediate circuit 9, which circuit 9 preferably supplies the electric motors 1, the vehicle can have a vehicle low-voltage electrical energy distribution system with a vehicle direct current voltage of about 12 V, about 24 V or a similar value. The vehicle low-voltage electrical energy distribution system can include a conventional rechargeable battery 21, and can provide power to numerous conventional consumers 23 on the vehicle, such as the headlights etc., and also to the electronic control components of the control systems 11, 13, 15 and 17. During normal operation, the vehicle low-voltage electrical energy distribution system can preferably be supplied with power from a direct current converter 25, which converter 25 can transform the medium voltage of the direct current voltage intermediate circuit 9 to the low-voltage level of the vehicle electrical energy distribution system, and which converter 25 can simultaneously also charge the battery 21.

In accordance with one embodiment of the present invention, the converter 25 can also be considered to represent an operating voltage supply circuit.

It goes without saying that instead of the direct current converter 25, there can also be a conventional electrical generator which can be driven by the internal combustion engine 5. The electrical generator can be omitted, however, if the electrical energy which is already being produced by the generator 7 is used to supply the vehicle electrical energy distribution system.

To start the internal combustion engine 5 there can be a conventional electric starter motor, which starter motor can be supplied with electrical energy from the vehicle low-voltage electrical energy distribution system. Alternatively, the generator control system 13 can switch the generator 7 to operate as a motor, or starter motor, so that the generator 7 can also take over the starter function. In that case, the generator 7 can be supplied with electrical energy from the direct current voltage intermediate circuit 9, which circuit 9 can receive its electrical energy from the battery 21 via the direct current converter 25, which direct current converter 25 can preferably transform the voltage level of the vehicle electrical energy distribution system to the medium voltage level. Additionally or alternatively, a medium voltage battery 27 can also be connected to the direct current intermediate circuit 9. In such a case, the medium voltage battery 27 not only supplies power for the generator 7 during the starting operation, but can also be used for energy recovery during the regenerative or rheostatic electric motor braking of the vehicle by means of the electric motor 1.

To be able to start the internal combustion engine 5, even without the power supply from the conventional starter motor or from the generator 7 operated as a motor under emergency conditions, the present invention teaches that for the emergency starting operation, the traction control system 17, via the motor control system 11, can switch the electric motors 1 over so that they can operate as generators, and via the generator control system 13 can switch the generator 7 over so that it can operate as a motor. In this manner, by pushing or towing the vehicle or rolling it downhill, a direct current voltage can be accumulated in the direct current voltage intermediate circuit 9, which accumulated voltage can make it possible for the generator 7 being operated as a motor to start the internal combustion engine 5. The electric motors 1, which are acting as generators, can thereby be powered by the corresponding wheels 3. The electric motors 1 can thereby at least be initially passive, i.e. they are not controlled, when the electric motors 1 are operated as generators.

In addition, and in accordance with one embodiment of the present invention, the control system 17 can, in addition to switching the motor 1 to operation as a generator and the generator 7 to operation as a motor, control the converter 13a (or the auxiliary converter, if one is used) discussed above such that the converter 13a (or auxiliary converter) produces the proper alternating current for running the generator 7 as a motor during an emergency start-up procedure, so that the proper frequency and voltage are produced for optimum starting characteristics of the internal combustion engine 5. For example, when the vehicle is moved by external forces during an emergency start-up, the alternating current generated by the motor 1 operating as a generator will most likely have a low frequency and low voltage due to the slow rotation of the wheels. Then, as the speed of the vehicle is increased, the alternating current generated by the motor 1 will then have an increasingly higher and higher frequency and voltage. Thus, the control system 17 can preferably have circuitry which controls or regulates the application of this varying frequency of the alternating current in order to produce optimum direct current for optimal starting characteristics for the internal combustion engine 5. Then, as the internal combustion engine 5 is to be started, the alternating current generated by the converter 13a may, in accordance with one embodiment, preferably then generate an increasingly higher and higher frequency, or other electrical parameters conducive to producing adequate torque and speed of the generator 7 acting as a motor. Thus, the control system 17 can have circuitry which controls or regulates this varying frequency, or other electrical parameters, of the alternating current generated by the converter 13a, in order to produce optimum alternating current tailored to optimal starting motor characteristics of the generator 7, and thus for optimal starting of the internal combustion engine 5.

Before the emergency attempt to start the vehicle, the vehicle must essentially be accelerated to a speed at which the kinetic energy of the vehicle is sufficient for the starting procedure. The speed of travel could be estimated by the driver of the vehicle, and the emergency starting procedure could be initiated by means of a control mechanism 29, which control mechanism 29 can be actuated by the driver when the vehicle reaches a sufficient speed. The control mechanism 29, for example, can be a control switch which can be manually actuated by the driver. Alternatively, the control mechanism 29 can also be a sensor, which sensor measures the displacement of an accelerator pedal on the vehicle, so that the driver can initiate the emergency starting procedure, preferably by actuating the pedal. However, to eliminate the possibility of improper operation, the vehicle control system 17 can preferably respond to a vehicle speed sensor 31, and can essentially only permit initiation of the emergency starting operation when a specified speed threshold has been reached, at which threshold it can be assumed that the kinetic energy required for the starting procedure has been achieved. The vehicle speed sensor 31 can be a sensor which directly measures the speed of rotation of the wheels, but it can also be realized by other means which send a signal which is representative of the speed of the vehicle, e.g. commutation signals from the motor control system 11. Even if the vehicle speed threshold is defined by the sensor 31, it can be advantageous to have the beginning of the starting attempt initiated by the driver by means of the control mechanism 29, in order to prevent any surprises if the vehicle control system 17 automatically starts up the engine.

In accordance with one embodiment of the present invention, the vehicle speed sensor 31 can preferably include a conventional speedometer.

For the emergency starting procedure, the control systems 11, 13, 17, and possibly 15, essentially must be supplied with sufficient operating voltage before an attempt can be made to start the engine 5, to switch over the operation of the electric motors 1 and the generator 7, and then to be able to control them. In the event of a defect involving the battery 21 or the medium voltage battery 27, if the latter is fed via the direct current converter 25 without the battery 21 of the vehicle low-voltage electrical energy distribution system, it should essentially be guaranteed that the electric motors 1, which electric motors 1 are initially operating as uncontrolled generators, have accumulated sufficient operating voltage for the operation of the control systems 11, 13, 15 and 17, before an attempt is made by the vehicle electrical energy distribution system to start the engine 5. One of these control systems, but in particular the direct current converter 25, can have a voltage monitoring circuit, which voltage monitoring circuit can make certain that the operating voltage generated by the electric motors 1 is essentially only supplied to the vehicle electrical energy distribution system when it exceeds a voltage level which is sufficient for the operation of the electronic components. In this manner, improper operating conditions can be prevented.

In accordance with one embodiment, if the battery 21 is essentially completely dead, the control system 11 could have a power transfer or converter 11b which could convert the alternating current generated by the motor 1 to direct current to operate the control systems 11, 13, 15, and 17. As such, the arrow 17a can, in accordance with one embodiment be considered to represent a power flow from the power supply 11b to the various control systems 11, 13, 15, and 17.

During the emergency attempt to start the engine 5, the vehicle control system 17 can preferably determine whether the internal combustion engine 5 responds, and immediately after the engine 5 starts, the vehicle control system 17 returns the generator 7 to operating as a generator and the electric motors 1 to operating as motors. The starting of the internal combustion engine 5 can preferably be identified by the changing supply current that occurs when the generator operating as a motor is disconnected, or by the related brief increase in the rotational speed of the internal combustion engine 5. In particular, in embodiments in which the traction control system 17 controls the emergency starting procedure largely independently, it can be advantageous if the vehicle control system 11, 13, 15, 17 includes timers, which timers set a maximum duration of the emergency starting attempt and/or a minimum interval between successive attempts to start the engine 5. In this manner, unsuccessful attempts to start the engine can be prevented from leading to uncontrolled operating conditions.

Figure 2:
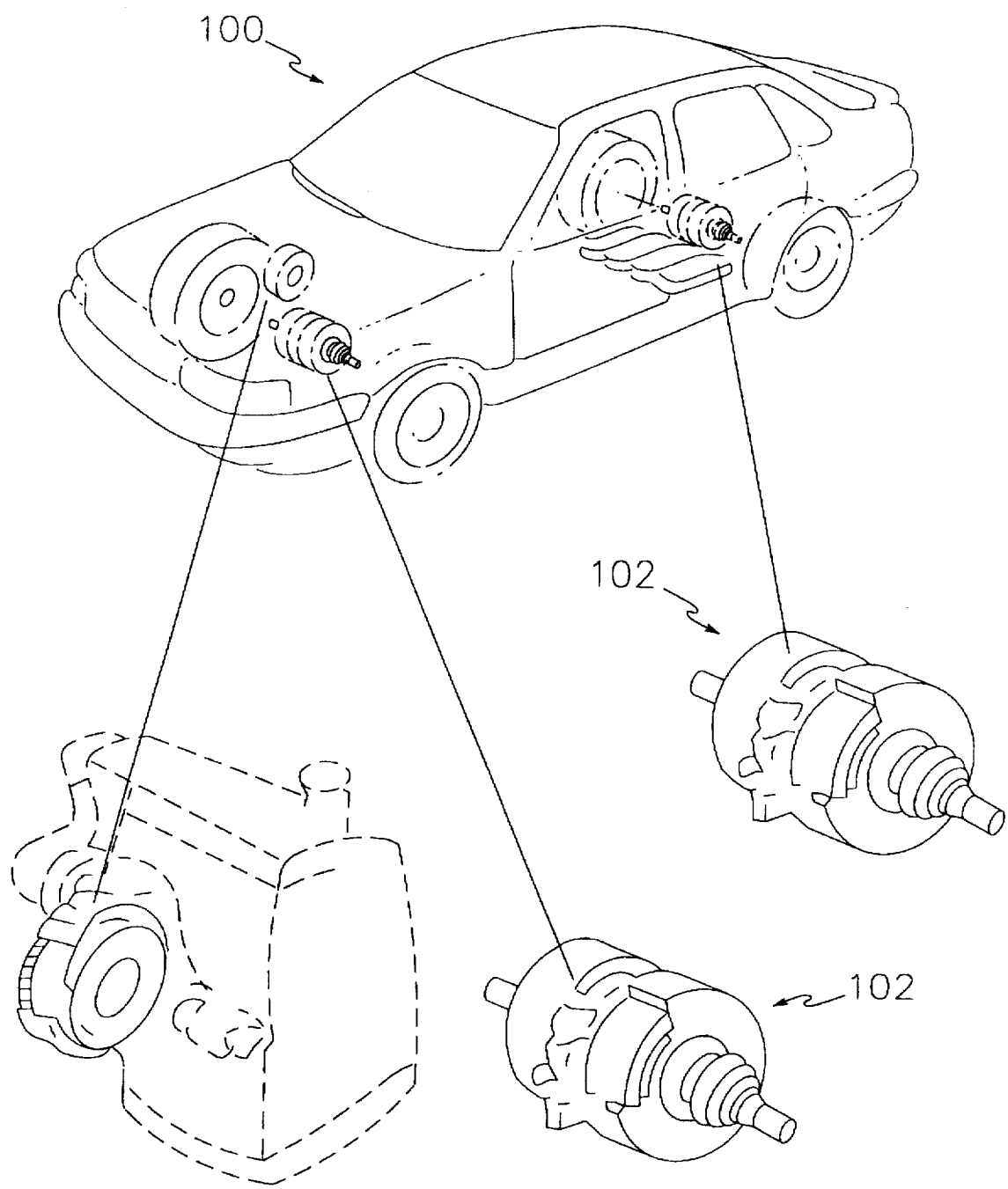
FIG. 2 illustrates a typical automobile which may employ a hybrid drive, such as an internal combustion engine-electric generator unit.

FIG. 2 illustrates a typical electric road motor vehicle, such as an automobile, in which the present invention may be employed. As shown, an automobile 100 may include two electric motor arrangements, 102, wherein each such motor arrangement can conceivably include two motors for driving a corresponding wheel. It will be appreciated from the disclosure herebelow that such motor arrangements can be driven by a combination, or hybrid, internal combustion engine-electric generator.

Also shown in FIG. 2 are the chassis 104 of automobile 100, a typical wheel 106, and a road vehicle tire 108 mounted on wheel 106.

The present invention may be employed, for example, in the assembly of other electric road motor vehicles, such as buses. Buses, for example, must frequently be designed to accommodate specific road widths, some road widths being extremely narrow relative to other road widths. The present invention, employed in a street bus or an airport bus, for instance, can make possible the specific track distance and dimensions required for assembly of buses for either narrow or wide roads.

One feature of the invention resides broadly in the hybrid propulsion system for a motor vehicle comprising: an internal combustion engine 5, an electrical generator 7 in a driving connection with the internal combustion engine 5, at least one electric motor 1, in particular connected to the generator 7 by means of a direct current intermediate circuit 9, for the propulsion of at least one of the wheels 3 of the motor vehicle, and an electronic control system 11, 13, 15, 17 which controls the generator 7 and at least the one electric motor 1, and possibly also the internal combustion engine 5 during traction operation, characterized by the fact that by means of the control system 11, 13, 15, 17 for the emergency starting of the internal combustion engine 5, the generator 7 can be switched over to operate as a motor which drives the internal combustion engine 5 and at least one of the electric motors 1 can be switched over to operate as a generator driven by the wheel 3, such that when there is a movement of the motor vehicle external forces, the electric motor 1 being operated as a generator supplies power to the generator 7 being operated as a motor.

Another feature of the invention resides broadly in the hybrid propulsion system characterized by the fact that the control system 11, 13, 15, 17 responds to vehicle speed sensing means 31 and only permits the beginning of the emergency starting procedure when the vehicle speed sensing means 31 signal that the vehicle has reached a speed which is higher than a specified vehicle speed threshold.

Yet another feature of the invention resides broadly in the hybrid propulsion system characterized by the fact that the control system 11, 13, 15, 17 responds to a control mechanism 29 which is actuated by the driver of the vehicle, and permits the emergency starting procedure only when the control mechanism 29 is actuated.

Still another feature of the invention resides broadly in the hybrid propulsion system characterized by the fact that the control mechanism 29 is designed as a manually actuated control switch or as a sensor which detects the displacement of an accelerator pedal of the motor vehicle.

A further feature of the invention resides broadly in the hybrid propulsion system characterized by the fact that the control system 11, 13, 15, 17 responds to operational status sensors which detect the starting of the internal combustion engine 5, and then terminate the operation of the generator 7 as a motor and the operation of the electric motor 1 as a generator.

Another feature of the invention resides broadly in the hybrid propulsion system characterized by the fact that the control system 11, 13, 15, 17 comprises timing means which set a maximum duration for an emergency starting phase and/or a minimum interval between successive emergency starting phases.

Yet another feature of the invention resides broadly in the hybrid propulsion system characterized by the fact that the control system 11, 13, 15, 17 for the supply of the operating voltage is connected to an operating voltage supply circuit 25 which is supplied from the electric motor 1.

Still another feature of the invention resides broadly in the hybrid propulsion system characterized by the fact that the operating voltage supply circuit 25 comprises voltage monitoring means which release the operating voltage for the control system 11, 13, 15, 17 only when the operating voltage exceeds a specified voltage threshold.

A further feature of the invention resides broadly in the hybrid propulsion system characterized by the fact that the operating voltage supply circuit 25 is connected to the direct current voltage intermediate circuit 9, in particular by means of a direct current converter.

Another feature of the invention resides broadly in the hybrid propulsion system characterized by the fact that the operating voltage supply circuit 25 is designed as a charging circuit for a vehicle low-voltage electrical energy distribution system battery 21 of the motor vehicle.

Some examples of hybrid engines and control systems therefor which my be utilized in accordance with the present invention are disclosed in the following U.S. patents: U.S. Pat. No. 4,305,254 to Kawakatsu et al. on Dec. 15, 1981, entitled "Control Apparatus and Method for Engine/Electric Hybrid Vehicle"; and No. 4,335,429 to Kawakatsu on Jun. 15, 1982, entitled "Control Apparatus for Engine/Electric Hybrid Vehicle".

Some examples of electric motors which can be operated as generators which may be utilized in accordance with the present invention are disclosed in the following U.S. patents: U.S. Pat. No. 5,327,992 to Boll on Jul. 12, 1994, entitled "Method for Controlling a Hybrid Drive Which Drives a Vehicle"; No. 5,249,637 to Heidl et al. on Oct. 5, 1993, entitled "Hybrid Vehicle"; and No. 5,323,743 to Kristiansson on Jun. 28, 1994, entitled "Sure-start Device for Internal Combustion Engine".

Some examples of generators which can be operated as motors which may be utilized in accordance with the present invention are disclosed in the following U.S. patents: U.S. Pat. No. 5,272,379 to Sugiyama et al. on Dec. 21, 1993, entitled "Power Supply Device for an Electric Vehicle"; No. 5,283,471 to Raad on Feb. 1, 1994, entitled "DC Generator and Back-up Engine Starting Apparatus"; and No. 5,281,905 to Dhyanchand et al. on Jan. 25, 1994, entitled "Induction Machine Based Hybrid Aircraft Engine Starting/Generating Power System".

Some examples of converters which may utilized in accordance with the present invention are disclosed in the following U.S. patents: U.S. Pat. No. 4,651,078 to Todoroki et al. on Mar. 17, 1987, entitled "Device for Driving an Induction Motor"; No. 4,673,858 to Saito on Jun. 16, 1987, entitled "Power Converter for AC Load"; No. 4,757,435 to Wood et al. on Jul. 12, 1988, entitled "Static-controlled Current-source AC/DC Power Converter and DC/AC Power Converter, and Protection System Embodying the Same"; No. 4,636,927 to Rhyne et al. on Jan. 13, 1987, entitled "DC to AC Converter"; 4,181,932 to Fujiwara on Jan. 1, 1980, entitled "Power Converter"; No. 4,366,532 to Rosa et al. on Dec. 28, 1982, entitled "AC/DC or DC/AC Converter System With Improved AC-line Harmonic Reduction"; No. 4,165,801 to Watanabe et al. on Aug. 28, 1979, entitled "Static Leonard System"; and No. 4,894,762 to Steinshorn on Jan. 16, 1990, entitled "Method and Apparatus to Avoid Commutation Failure in a Regenerative Converter".

Some examples of DC to AC converters which may be utilized in accordance with the present invention are be disclosed in the following U.S. patents: U.S. Pat. No. 4,173,040 to Borzov et al. on Oct. 30, 1979, entitled "DC to AC Voltage Converter"; No. 4,196,469 to Gurwicz on Apr. 1, 1980, entitled "DC-AC Converter Including Synchronized Switching"; No. 4,453,205 to Brakus on Jun. 5, 1984, entitled "DC/AC Converter With Shunt Regulated Load"; No. 4,443,750 to Altena on Apr. 17, 1984, entitled "Energy Saving Motor Speed Controller"; No. 4,446,052 to Thrap on Aug. 14, 1984, entitled "Programmable DC-To-AC Voltage Converter"; and No. 4,528,457 to Keefe et al. on Jul. 9, 1985, entitled "DC-AC Converter for Supplementing an AC Power Source".

Some examples of AC to DC converters which may be utilized in accordance with the present invention are disclosed in the following U.S. patents: U.S. Pat. No. 4,639,848 to Sakai on Jan. 27, 1987, entitled "Method and System for Controlling an AC-DC Converter System"; No. 4,656,571 to Umezu on Apr. 7, 1987, entitled "Frequency Converting Device and Control Method Therefor"; No. 4,739,466 to Glennon et al. on Apr. 19, 1988, entitled "Regulated AC/DC Converter"; No. 4,85,837 to Gulczynski on Aug. 1, 1989, entitled "Synchronous Switching Power Supply With Flyback Converter"; and No. 4,719,552 to Albach et al. on Jan. 12, 1988, entitled "AC-DC Converter Triggered by Variable Frequency Pulses".

Some examples of variable frequency converters which may be utilized in accordance with the present invention are disclosed in the following U.S. patents: U.S. Pat. No. 4,743,777 to Shilling et al. on May 10, 1988, entitled "Starter Generator System With Two Stator Exciter Windings"; and No. 5,093,751 to Yuki et al. on Mar. 3, 1992, entitled "Carry Noise Measuring System for Magnetic Recording Medium".

An example of a DC to DC converter which may be utilized in accordance with the present invention is disclosed in U.S. Pat. No. 4,513,361 to Rensink on Apr. 23, 1985, entitled "Multi-phase DC-to-AC and DC-to-DC Boost Converter".

Examples of voltage monitors and voltage regulators which may be utilized in accordance with the present invention may be disclosed in the following U.S. patents: U.S. Pat. No. 5,302,889 to Marsh on Apr. 12, 1994, entitled "Voltage Regulator"; No. 5,264,781 to Miller et al. on Nov. 23, 1993, entitled "Current Control/Power Limiter Circuit"; and No. 5,255,177 to Oku on Oct. 19, 1993, entitled "High-voltage Power Source Control Device".

Examples of hybrid drive arrangements, such as internal combustion engine-electric generator arrangements, and components associated therewith, such as control arrangements and individual motors for driving corresponding wheels, may be found in the following U.S. patents: U.S. Pat. No. 5,327,987, which issued to Abdelmalek on Jul. 12, 1994; No. 5,318,142, which issued to Bates et al. on Jun. 7, 1994; No. 5,301,764, which issued to Gardner on Apr. 12, 1994; No. 5,249,637, which issued to Heidl et al. on Oct. 5, 1993; No. 5,176,213, which issued to Kawai et al. on Jan. 5, 1993; No. 5,327,992, which issued to Boll on Jul. 12, 1994; No. 5,291,960, which issued to Brandenburg et al. on Mar. 8, 1994; and No. 5,264,764, which issued to Kuang on Nov. 23, 1993.

Examples of electric and hybrid vehicles, and related components, may be or are disclosed in the following U.S. patents: U.S. Pat. No. 5,251,721 entitled "Semi-hybrid Electric Automobile" to Ortenheim; No. 5,004,061 entitled "Electrically Powered Motor Vehicle" to Andruet; No. 5,289,100 entitled "System for Powering, Speed Control, Steering, and Braking" to Joseph; No. 5,265,486 entitled "Portable External Drive Assembly" to AAMCO Corporation; No. 5,289,890 entitled "Drive Unit for Electric Motor Vehicle" to Aisin; and No. 5,310,387 entitled "Differential Motor Drive" to Hughes Aircraft Company.

Additional examples of electric vehicles in which the present invention may be utilized may be or are disclosed in the following U.S. patents: U.S. Pat. No. 5,166,584 entitled "Electric Vehicle" to Nissan; No. 5,161,634 entitled "Electric Vehicle" to Kubota Corporation; and No. 5,150,045 entitled "Electric Automobile" to Kaisha.

Examples of electronic commutation devices, which may be utilized in accordance with the embodiments of the present invention, may be found in the following U.S. patents: U.S. Pat. No. 5,164,623 entitled "Independent-drive Wheel for a Wheel-mounted Vehicle"; No. 5,117,167 entitled "Commutating Energy Suppression Circuit for an Electronically Commutated DC Motor" to Rotron; No. 5,258,679 entitled "Structure of DC Motor with Electronic Commutation" to ECIA; and No. 5,117,167 entitled "Commutating Energy Suppression Circuit for an Electronically Commutated DC Motor" to Rotron.

Examples of Phase angle sensors, which may be utilized in accordance with the embodiments of the present invention, may be found in the following U.S. patents: U.S. Pat. No. 5,203,290 entitled "Intake and/or Exhaust-valve Timing Control System for Internal Combustion Engine" to Atsugi Unisia; No. 5,277,063 entitled "Single Plane Trim Balancing" to General Electric; No. 5,353,636 entitled "Device for Determining Misfiring of Cylinders in Multi-cylinder Engines" to Toyota; No. 5,068,876 entitled "Phase Shift Angle Detector" to Sharp; No. 5,097,220 entitled "Circuit for Demodulating PSK Modulated Signal by Differential-Defection" to Japan Radio; and No. 5,063,332 entitled "Feedback Control System for a High-efficiency Class-D Power Amplifier Circuit".

Examples of three-phase motors for use with electric or hybrid vehicles, which may be utilized in accordance with the embodiments of the present invention, may be found in the following U.S. patents: U.S. Pat. No. 5,182,508, which issued to Schauder on Jan. 26, 1993; No. 5,194,800, which issued to Conzelmann et al. on Mar. 16, 1993; No. 5,216,212, which issued to Golowash et al. on Jun. 1, 1993; No. 5,230,402, which issued to Clark et al. on Jul. 27, 1993; and No. 5,294,853, which issued to Schluter et al. on Mar. 15, 1994.

Examples of sensors, such as speed and/or torque sensors, which may be utilized in accordance with the embodiments of the present invention, may be found in the following U.S. patents: U.S. Pat. No. 5,294,871, which issued to Imaseki on Mar. 15, 1994; No. 5,345,154, which issued to King on Sep. 6, 1994; No. 5,359,269, which issued to Wedeen on Oct. 25, 1994; No. 5,182,711, which issued to Takahashi et al. on Jan. 26, 1993; No. 5,245,966, which issued to Zhang et al. on Sep. 21, 1993; and No. 5,332,059, which issued to Shirakawa et al. on Mar. 15, 1994.

Examples of other media having components which may be utilized in accordance with the embodiments of the present invention, may be found in the following U.S. patents: U.S. Pat. No. 5,277,063, which issued to Thomas on Jan. 11, 1994; No. 5,373,630, which issued to Lucier et al. on Dec. 20, 1994; No. 5,373,632, which issued to Lucier et al. on Dec. 20, 1994.

Examples of battery-operated electric vehicles, having components, such as batteries for providing electrical power, which may be utilized in accordance with the embodiments of the present invention, may be found in the following U.S. patents: U.S. Pat. No. 5,229,703, which issued to Harris on Jul. 20, 1993; No. 5,325,912, which issued to Hotta et al. on Jul. 5, 1994; No. 5,332,630, which issued to Hsu on Jul. 26, 1994; No. 5,369,540, which issued to Konrad et al. on Nov. 29, 1994; No. 5,373,910, which issued to Nixon on Dec. 20, 1994.

Examples of converter arrangements, having components which may be utilized in accordance with the embodiments of the present invention, may be found in the following U.S. patents: U.S. Pat. No. 5,309,073, which issued to Kaneko et al. on May 3, 1994; No. 5,321,231, which issued to Schmalzriedt on Jun. 14, 1994; No. 5,341,083, which issued to Klontz et al. on Aug. 23, 1994; No. 5,350,994, which issued to Kinoshita et al. on Sep. 27, 1994; and No. 5,368,116, which issued to Iijima et al. on Nov. 29, 1994.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 35 613.7, filed on Oct. 5, 1994, having inventors Alfred Rüthlein and Erich Karg, and DE-OS P 44 35 613.7 and DE-PS P 44 35 613.7, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit end scope of the invention.

What is claimed is:

1. A method of operating and starting a hybrid road vehicle under emergency conditions, said method comprising the steps of:
   moving the hybrid road vehicle and moving at least one wheel of the hybrid road vehicle;
   switching an electrical generator from operation as a generator to operation as a motor, the electrical generator being in driving connection with an internal combustion engine;
   switching at least one electric motor disposed at the at least one wheel from operation as a motor to operation as a generator;
   connecting the at least one motor to the electrical generator with connecting circuitry;
   driving the at least one electric motor as a generator during movement of the at least one wheel of the hybrid road vehicle;
   accumulating electric energy from the at least one electric motor;
   supplying electric energy, generated by the at least one electric motor, to the electrical generator; and
   starting the internal combustion engine with the electrical generator.

2. The method according to claim 1, further comprising one of the following sets of steps a) and b):
   a) sensing the speed of the hybrid road vehicle during movement of the hybrid road vehicle, and providing a signal indicating the speed of the hybrid road vehicle;
   permitting an emergency start-up process to begin substantially only when the signal is greater than a predetermined speed threshold; and
   b) manually actuating control means and permitting an emergency start-up procedure to begin substantially only upon actuation of the control means.

3. The method according to claim 2, further comprising the steps of:
   sensing the operational status of the internal combustion engine, at least during an emergency start-up process;
   switching the electrical generator from operation as a motor back to operation as a generator upon the starting of the internal combustion engine; and
   switching the at least one electric motor from operation as a generator back to operation as a motor upon the starting of the internal combustion engine.

4. The method according to claim 3, further comprising the use of a timer to establish a maximum duration of an emergency starting process.

5. The method according to claim 3, further comprising the use of a timer to establish a minimum interval of time between successive emergency start-up processes.

6. A hybrid road vehicle comprising:
   a chassis;
   a plurality of wheels being rotationally mounted on said chassis;
   a plurality of road vehicle tires being disposed on corresponding ones of said plurality of wheels;
   a hybrid propulsion system, said hybrid propulsion system comprising:
     an internal combustion engine;
     an electrical generator in driving connection with said internal combustion engine;
     at least one electric motor for propelling at least one of said plurality of wheels;
     connecting circuitry connecting said at least one electric motor to said electrical generator;
   means for electronically controlling at least said generator and said at least one electric motor during operation of said hybrid road vehicle;
   said means for electronically controlling comprising means for starting said hybrid road vehicle under emergency conditions;
   said means for starting said hybrid road vehicle under emergency conditions comprising:
     first means for switching said electrical generator from operation as a generator to operation as a motor;
     second means for switching said at least one electric motor from operation as a motor to operation as a generator;
     circuit means for supplying electric energy generated by said at least one electric motor to said electrical generator, to start said internal combustion engine; and
     said at least one electric motor being disposed to be driven by movement of said at least one of said plurality of wheels during movement of said hybrid road vehicle, thus driving said at least one electric motor as a generator, and being connected to said circuit means to supply electrical energy to said electrical generator when said electrical generator is being operated as a motor.

7. The hybrid road vehicle according to claim 6 wherein said means for electronically controlling further comprises at least one of a) and b):
   a) means for sensing the speed of said hybrid road vehicle during movement of said hybrid road vehicle, said sensing means having means for providing a signal indicating the speed of said hybrid road vehicle;
   means for receiving said signal from said sensing means and for permitting an emergency start-up process to begin substantially only when said signal received from said sensing means is greater than a predetermined speed threshold; and b) control means for being actuated by an operator of said hybrid road vehicle;

means for permitting an emergency start-up procedure to begin substantially only upon actuation of said control means by the operator of said hybrid road vehicle.

8. The hybrid road vehicle according to claim 7 wherein said means for electronically controlling further comprises:

means for sensing the operational status of said internal combustion engine, at least during an emergency start-up process;

said means for sensing the operational status having means for providing a signal indicating the operating status of said internal combustion engine;

third means for switching said electrical generator from operation as a motor back to operation as a generator based on said signal from said means for sensing the operational status of said internal combustion engine; and fourth means for switching said at least one electric motor from operation as a generator back to operation as a motor based on said signal from said means for sensing the operational status of said internal combustion engine.

9. The hybrid road vehicle according to claim 8 wherein said means for electronically controlling further comprises timing means, said timing means comprising one of c) and d):

c) means for establishing a maximum duration of an emergency starting process; and d) means for establishing a minimum interval of time between successive emergency start-up processes.

10. The hybrid road vehicle according to claim 9 wherein said control means comprises one of:

a manually actuable control switch; and a sensor for detecting displacement of an accelerator pedal of said hybrid road vehicle.

11. The hybrid road vehicle according to claim 10 wherein said hybrid propulsion system further comprises:

means for supplying an operating voltage to said means for electronically controlling, said means for supplying an operating voltage having means for receiving voltage from said at least one electric motor being operated as a generator; and said means for supplying an operating voltage comprises means for monitoring voltage received from said at least one electric motor being operated as a generator, said monitoring means having means for supplying operating voltage to said means for electronically controlling substantially only when the voltage from said at least one electric motor exceeds a predetermined voltage threshold.

12. The hybrid road vehicle according to claim 11 wherein:

said connecting circuitry comprises a direct current intermediate circuit; and said hybrid propulsion system further comprises a direct current converter, said means for supplying an operating voltage being connected to said direct current intermediate circuit by means of said direct current converter.

13. The hybrid road vehicle according to claim 12 wherein:

said hybrid road vehicle comprises at least one battery; and said means for supplying an operating voltage comprises means for charging said at least one battery.

14. A method of operating and starting a hybrid road vehicle under emergency conditions, the hybrid road vehicle comprising: a chassis; a plurality of wheels being rotationally mounted on said chassis; a plurality of road vehicle tires being disposed on corresponding ones of said plurality of wheels; a hybrid propulsion system, said hybrid propulsion system comprising: an internal combustion engine; an electrical generator in driving connection with said internal combustion engine; at least one electric motor for propelling at least one of said plurality of wheels; connecting circuitry connecting said at least one electric motor to said electrical generator; means for electronically controlling at least said generator and said at least one electric motor during operation of said hybrid road vehicle; said means for electronically controlling comprising means for starting said hybrid road vehicle under emergency conditions; said means for starting said hybrid road vehicle under emergency conditions comprising: first means for switching said electrical generator from operation as a generator to operation as a motor; second means for switching said at least one electric motor from operation as a motor to operation as a generator; circuit means for supplying electric energy generated by said at least one electric motor to said electrical generator to start said internal combustion engine; said at least one electric motor being disposed to be driven by movement of said at least one of said plurality of wheels during movement of said hybrid road vehicle, thus driving said at least one electric motor as a generator, and being connected to said circuit means to supply electrical energy to said electrical generator when said electrical generator is being operated as a motor, said method comprising the steps of:

providing a chassis;

providing a plurality of wheels being rotationally mounted on said chassis;

providing a plurality of road vehicle tires being disposed on corresponding ones of said plurality of wheels;

providing a hybrid propulsion system, said step of providing said hybrid propulsion system comprising:

providing an internal combustion engine;

providing an electrical generator in driving connection with said internal combustion engine;

providing at least one electric motor for propelling at least one of said plurality of wheels;

providing connecting circuitry, the connecting circuitry connecting said at least one electric motor to said electrical generator;

providing means for electronically controlling at least said generator and said at least one electric motor during operation of said hybrid road vehicle;

said step of providing said means for electronically controlling further comprising the step of providing means for starting said hybrid road vehicle under emergency conditions;

said step of providing means for starting said hybrid road vehicle under emergency conditions comprising:

providing first means for switching said electrical generator from operation as a generator to operation as a motor;

providing second means for switching said at least one electric motor from operation as a motor to operation as a generator;

providing circuit means for supplying electric energy generated by said at least one electric motor to said electrical generator to start said internal combustion engine;

said method further comprising the additional steps of:
switching said electrical generator from operation as a generator to operation as a motor, with said first means for switching;
switching said at least one motor from operation as a motor to operation as a generator, with said second means for switching;
moving said hybrid road vehicle to move said at least one of said plurality of wheels to drive said at least one electric motor as a generator;
generating electric energy with said at least one electric motor;
supplying electric energy generated by said at least one electric motor to said electrical generator with said circuit means; and
starting said internal combustion engine with said electrical generator.

15. The method according to claim 14 wherein said step of providing said means for electronically controlling further comprises one of the following sets of steps a) and b):
a) providing means for sensing the speed of said hybrid road vehicle during movement of said hybrid road vehicle, said sensing means having means for providing a signal indicating the speed of said hybrid road vehicle;
providing means for receiving said signal from said sensing means and for permitting an emergency start-up process to begin substantially only when said signal received from said sensing means is greater than a predetermined speed threshold;
sensing the speed of said hybrid road vehicle during movement of said hybrid road vehicle, and providing a signal indicating the speed of said hybrid road vehicle, with said sensing means;
receiving said signal from said sensing means and permitting an emergency start-up process to begin, with said receiving means, when said signal received from said sensing means is greater than a predetermined speed threshold; and
b) providing control means for being actuated by an operator of said hybrid road vehicle;
providing means for permitting an emergency start-up process to begin substantially only upon actuation of said control means by the operator of said hybrid road vehicle;
actuating said control means;
permitting, with said means for permitting, an emergency start-up process to begin upon actuation of said control means.

16. The method according to claim 15 wherein said step of providing said means for electronically controlling further comprises:
providing means for sensing the operational status of said internal combustion engine, at least during an emergency start-up process, the means for sensing the operational status of said internal combustion engine having means for providing a signal indicating the operational status of the internal combustion engine;
providing third means for switching said electrical generator from operation as a motor back to operation as a generator based on said signal from said means for sensing the operational status of said internal combustion engine;

providing fourth means for switching said at least one electric motor from operation as a generator back to operation as a motor based on said signal from said means for sensing the operational status of said internal combustion engine;
sensing the operational status of said internal combustion engine during an emergency start-up process;
starting said internal combustion engine;
thereafter:
switching said electrical generator from operation as a motor back to operation as a generator, with said third switching means; and
switching said at least one motor from operation as a generator back to operation as a motor, with said fourth switching means.

17. The method according to claim 16 wherein said step of providing said means for electronically controlling further comprises providing timing means, the timing means comprising one of c) and d):
c) means for establishing a maximum duration of an emergency start-up process; and
d) means for establishing a minimum interval of time between successive emergency start-up processes;
said method further comprising one of the following steps e) and f):
e) establishing a maximum duration of an emergency start-up process; and
f) establishing a minimum interval of time between successive emergency start-up processes.

18. The method according to claim 17 wherein:
said step of providing said control means further comprises providing one of: a manually actuable control switch; and a sensor for detecting displacement of an accelerator pedal of said hybrid road vehicle;
said method further comprising one of:
manually actuating said control switch; and
detecting, with said sensor, displacement of the accelerator pedal of said hybrid road vehicle.

19. The method according to claim 18 wherein:
said step of providing said hybrid propulsion system further comprises:
providing means for supplying an operating voltage to said means for electronically controlling, said means for supplying an operating voltage having means for receiving voltage from said at least one electric motor being operated as a generator;
said step of providing said means for supplying an operating voltage further comprises providing means for monitoring voltage received from said at least one electric motor being operated as a generator, said monitoring means having means for supplying operating voltage to said means for electronically controlling substantially only when the voltage from said at least one electric motor exceeds a predetermined voltage threshold;
said method further comprises:
supplying an operating voltage to said means for electronically controlling, with said means for supplying an operating voltage;
receiving voltage from said at least one electric motor being operated as a generator, with said receiving means;
monitoring voltage received from said at least one electric motor being operated as a generator, with said monitoring means; and supplying operating voltage to said means for electronically controlling substantially only when the voltage from said at least one electric motor exceeds the predetermined voltage threshold, with said means for supplying operating voltage of said monitoring means.

20. The method according to claim 19 wherein:

said step of providing said connecting circuitry further comprises a direct current intermediate circuit;

said step of providing said hybrid propulsion system further comprises providing a direct current converter, said means for supplying an operating voltage being connected to said direct current intermediate circuit by means of said direct current converter;

said method further comprises providing said hybrid road vehicle with at least one battery;

said step of providing said means for supplying an operating voltage further comprises providing means for charging said at least one battery; and charging said at least one battery with said charging means.

21. A hybrid road vehicle comprising:

a chassis;

a plurality of wheels being rotationally mounted on said chassis;

a plurality of road vehicle tires being disposed on corresponding ones of said plurality of wheels;

a hybrid propulsion system, said hybrid propulsion system comprising:

an internal combustion engine;

an electrical generator in driving connection with said internal combustion engine;

at least one electric motor for propelling at least one of said plurality of wheels;

connecting circuitry connecting said at least one electric motor to said electrical generator;

circuitry configured to control at least said generator and said at least one electric motor during operation of said hybrid road vehicle;

said circuitry configured to control at least said generator and said at least one electric motor comprising circuitry configured to start said hybrid road vehicle under emergency conditions;

said circuitry configured to start said hybrid road vehicle under emergency conditions comprising:

a first switching device to switch said electrical generator from operation as a generator to operation as a motor;

a second switching device to switch said at least one electric motor from operation as a motor to operation as a generator;

a circuit configured to supply electric energy generated by said at least one electric motor to said electrical generator, to start said internal combustion engine; and said at least one electric motor being disposed to be driven by movement of said at least one of said plurality of wheels during movement of said hybrid road vehicle, thus driving said at least one electric motor as a generator, and being connected to said circuit to supply electrical energy to said electrical generator when said electrical generator is being operated as a motor.

* * * * *